May 5, 1964
J. S. GARWOOD
3,131,568
ANTI-FRICTION AXIAL END PLAY LIMITING DEVICE
Filed Aug. 27, 1962
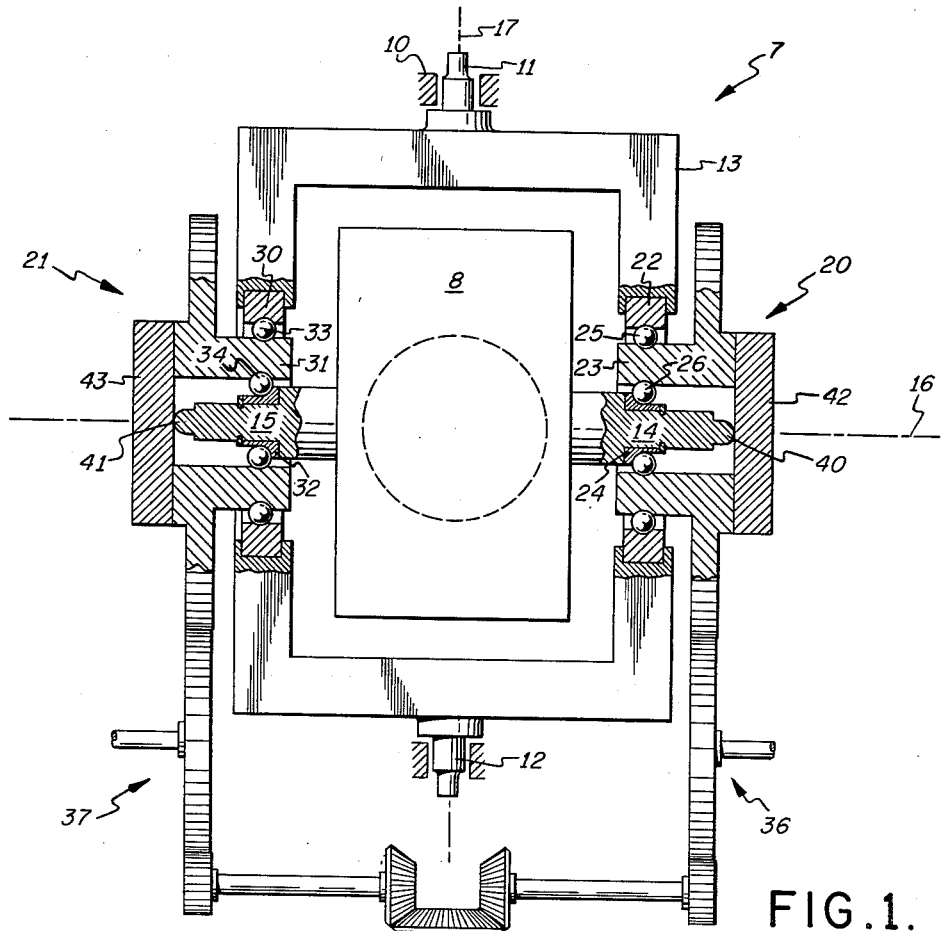
FIG.1.
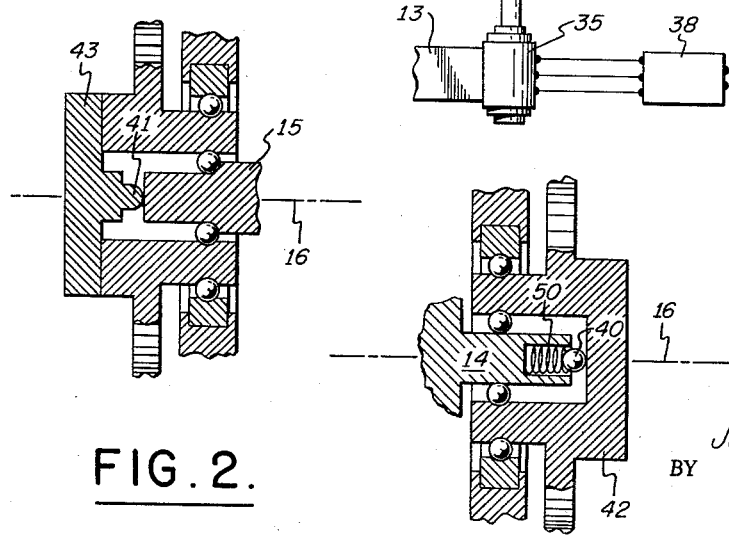
FIG.2.
FIG.3.
INVENTOR.
JOHN S. GARWOOD
BY
*H. P. Terry*
ATTORNEY

United States Patent Office 3,131,568
Patented May 5, 1964

3,131,568
ANTI-FRICTION AXIAL END PLAY LIMITING DEVICE
John S. Garwood, Searingtown, N.Y., assignor to Sperry Rand Corporation, Great Neck, N.Y., a corporation of Delaware
Filed Aug. 27, 1962, Ser. No. 219,578
7 Claims. (Cl. 74—5)

The present invention relates to substantially eliminating the undesirable torques associated with axial and play limiting devices.

The present invention is particularly applicable to improving the accuracy of gyroscopic instruments. The accuracy of a gyroscopic instrument is usually defined as a certain level of drift rate or random wander of the gyro spin axis in inertial space. In extremely high accuracy devices, particularly gyroscopic apparatus, there is an increasing demand for higher accuracy instruments. One of the problems in developing higher accuracy gyroscopic instruments is that of minimizing torques resulting from mass shift acted upon by gravity or other accelerations. A major source of such mass shift in ball bearing supported gyros is axial end play in the trunnion bearings. The present invention provides a means for effectively eliminating the axial end play and at the same time minimizing the drift-producing torques normally associated with such devices.

Prior art axial end play limiting devices in gyroscopes have utilized ball-shaped pivots on the centerline of the extremities of trunnions which bear against anvils that are fixed to the gimbal. By bearing against fixed anvils, torques are created which cause the sensitive element of the gyroscope to precess undesirably. Further in the presence of accelerations, in cases of zero end play or with finite end loading, the axis defined by the pivot points of the ball-shaped pivots bearing against respective fixed anvils may not be coincident with the axis of rotation of the sensitive element thereby creating torques which increase the gyro drift rate.

It is a primary object of the present invention to provide axial end play limiting without introducing undesirable torques on the element supported to have its axial end play limited.

It is an additional object of the present invention to provide apparatus for effectively eliminating the torque caused by axial end play limiting in gyroscopic devices.

It is a further object of the present invention to provide apparatus for averaging to effectively eliminate the torques created by axial end play limiting devices.

The above objects are accomplished, for example, in a gyroscope by pivoting ball-shaped axial end play elements on intermediate rotatable members journaled between the outer gimbal and the inner gimbal. By imparting rotary motion to the intermediate members in opposite directions with respect to each other and after a short period reversing their direction of motion, the cyclic rotation will (1) tend to have a minimum disturbance torque effect on the sensitive element because of the opposite directions of rotation of the intermediate members, and (2) tend to average clockwise and counter clockwise torques generated at each of the ball-shaped elements because of the periodic reversal in the direction of rotation of the intermediate members.

Referring to the drawings, FIG. 1 is a longitudinal section of a two degree of freedom gyroscope embodying the present invention, FIG. 2 is a sectional view of an alternative embodiment of an axial end play limiting device, and FIG. 3 is a sectional view of another embodiment of an axial end play limiting device.

Although the invention will be described as applied to one axis of a two degree of freedom gyroscope, it will be appreciated that it is equally applicable to both axes, single degree of freedom gyroscopes and end play limiting devices in general.

Referring to FIG. 1, a two degree of freedom gyroscope 7 includes an inner gimbal or rotor case 8 known as the sensitive element whose rotor (shown in dotted lines) is spun about a substantially vertical axis, for example, by conventional motor means not shown. The rotor case 8 is universally supported within a housing schematically shown at 10 by means of trunnions 11 and 12 mounted on an outer gimbal 13 while trunnions 14 and 15 mounted on the rotor case 11 are journaled about an axis 16 to the gimbal 13 by diametrically opposed composite rotatable bearings 20 and 21 respectively. The trunnions 11 and 12 define an axis 17 perpendicular to the axis 16.

The bearings 20 and 21 are of the type disclosed in U.S. Patent 2,970,480 issued February 7, 1961 to E. L. Zeigler et al., entitled Anti-friction Support Mechanism for Gyroscopic Devices. The composite bearing 20 comprises an outer race 22 associated with the gimbal 13, an intermediate rotatable member or race 23, and an inner race 24 associated with the trunnion 14. Bearing balls 25 are disposed between the outer race 22 and intermediate race 23 while bearing balls 26 are disposed between the intermediate race 23 and the inner race 24. Similarly, the composite bearing 21 comprises an outer race 30, an intermediate race 31 and an inner race 32 as well as bearing balls 33 separating the outer race and the inner race 31, and bearing balls 34 separating the intermediate race 31 and the inner race 32.

Preferably, the middle races 23 and 31 are rotatable through several revolutions in each direction and each middle race is rotated in a direction opposite to its diametrically opposed middle race. Further, the direction of rotation of each middle race is periodically and simultaneously reversed for improving the accuracy of the gyroscopic instrument 7 as more fully explained in the aforementioned U.S. Patent 2,970,480. A suitable mechanism for accomplishing this result may be an electric motor 35 which drives the intermediate races 23 and 31 through respective gear trains 36 and 37. The direction of rotation of the motor 35 may be periodically reversed by means of an electrical timing device 38 or any other suitable means as more fully described in said U.S. Patent 2,970,480.

Tests have shown that a gyroscope supported in composite bearings of the type shown at 20 and 21 performs better when the bearings 20 and 21 act as radial bearings rather than thrust bearings. Therefore it is desirable to reduce the loading on the bearings 20 and 21 in the direction of the axis 16 as much as possible. Further any displacement of the rotor case 8 with respect to the axis 17 in the direction of the axis 16, for example in the presence of an acceleration, will cause an undesirable torque about the axis 17. In order to obtain optimum operation of the bearings 20 and 21, it is often desirable to adjust the bearings 20 and 21 to allow freedom or axial play in the direction of the axis 16 between the rotor case 8 and the outer gimbal 13. This axial play is normally between the trunnions 14 and 15 and their respective intermediate races 23 and 31 with no axial or radial play between the intermediate races 23 and 31 and the outer gimbal 13.

In order to limit the degree of axial play of the rotor case 8, axial end play limiting elements in the form of balls 40 and 41 are mounted on the extremities of the trunnions 14 and 15 respectively extending from the centerline thereof. The balls 40 and 41 bear against and pivot upon anvils 42 and 43 respectively. In accordance with the present invention, the anvils 42 and 43 are mounted on respective intermediate races 23 and 31 for rotation therewith. The anvils 42 and 43 may be of any suitable form to provide axial end play limiting in cooperation with the balls 40 and 41 respectively and are disclosed as a flat circular disc or plate secured to outboard extremities of each of the intermediate races 23 and 31 with the balls 40 and 41 bearing against respective centers thereof.

In operation, the intermediate races 23 and 31 which carry anvils 42 and 43 respectively are rotated in opposite directions with respect to each other and have their respective direction of rotation periodically and simultaneously reversed. This cyclic rotation minimizes the net undesirable torque effect on the sensitive element 8 due to the opposite directions of rotation of the anvils 42 and 43 and also averages clockwise and counter clockwise torques generated at the balls 40 and 41 by means of the periodic reversal in the direction of rotation of the anvils 42 and 43.

Preferably, the balls 40 and 41 are mounted on respective trunnions 14 and 15, however, as shown in FIG. 2 they can alternatively be mounted on the anvils 42 and 43 respectively and bear against respective trunnions 14 and 15. With this arrangement however, there is a greater possibility that the balls 40 and 41 will pivot at a point which is not coincident with the axis 16 and thereby introduce an additional undesirable torque on the sensitive element 8.

In certain instances, it may be advisable as shown in FIG. 3 to spring load the balls 40 and 41 by means of respective springs 50 and 51 in directions to maintain contact with respective anvils 42 and 43 for imparting a predetermined load to respective intermediate races 23 and 31. In this manner the normal force between a ball and its associated anvil can be more readily controlled or adjusted. The spring loading is adjusted as light as possible consistent with the accelerations expected to be experienced.

Further, it may also be desirable as shown in FIG. 3 to maintain the diameters of the respective trunnions 14 and 15 constant throughout their respective lengths in order that the ball tracks of their associated bearing balls 26 and 34 are substantially identical in spite of axial movement of the rotor housing 8 in the direction of the axis 16. This may be utilized with the embodiments shown in FIGS. 1, 2 or 3.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:
1. In apparatus having a sensitive element,
(1) a pair of trunnions carried by said sensitive element,
(2) a second element,
(3) a separate rotatable member journaled to each of said trunnions and upon which said second element is journaled,
(4) means for simultaneously imparting rotary motion to both of said members in opposite directions,
(5) means for periodically reversing the direction of motion of said members,
(6) and means associated with each of said rotatable members and cooperative with respective extremities of said trunnions for limiting the axial end play of said trunnions while minimizing the effects of the undesirable torques occasioned thereby with respect to said sensitive element.

2. In gyroscopic apparatus having a sensitive element,
(1) a pair of trunnions carried by said sensitive element,
(2) a second element,
(3) a separate rotatable member journaled to each of said trunnions and upon which said second element is journaled,
(4) means for simultaneously imparting rotary motion to both of said members in opposite directions,
(5) means for periodically reversing the direction of motion of said members,
(6) and axial end play limiting means mounted on the extremities of each of said trunnions and cooperative with respective rotatable members for limiting the axial end play of said trunnions with a minimum net undesirable torque experienced by said sensitive element.

3. In apparatus having a sensitive element,
(1) a pair of trunnions carried by said sensitive element,
(2) a second element,
(3) a separate rotatable member journaled to each of said trunnions and upon which said second element is journaled,
(4) means for simultaneously imparting rotary motion to both of said members in opposite directions,
(5) means for periodically reversing the direction of motion of said members,
(6) each of said trunnions including extremities extending from the center line of said trunnions,
(7) and said rotatable members each including anvil means connected thereto cooperative with respective extensions of said trunnions which together provide axial end play limiting with a minimum net undesirable coercive force experienced by said sensitive element.

4. In apparatus as recited in claim 3 in which said extensions provide substantially point contact with said respective anvil means.

5. In apparatus as recited in claim 3 in which said extensions are ball shaped to provide substantially point contact with respect to said anvil.

6. In apparatus as recited in claim 5 in which said ball-shaped extensions are resiliently urged in a direction to maintain contact with respective anvil means for imparting a predetermined load to each of said rotatable members.

7. In apparatus as recited in claim 3 in which each of said trunnions have a constant diameter throughout its respective length.

References Cited in the file of this patent
UNITED STATES PATENTS

| | | |
|---|---|---|
| 2,577,942 | Agins | Dec. 11, 1951 |
| 2,970,480 | Ziegler et al. | Feb. 7, 1961 |
| 3,082,629 | Jones et al. | Mar. 26, 1963 |